United States Patent
Snell

(10) Patent No.: US 7,295,671 B2
(45) Date of Patent: Nov. 13, 2007

(54) ADVANCED ENCRYPTION STANDARD (AES) HARDWARE CRYPTOGRAPHIC ENGINE

(75) Inventor: Dorian L. Snell, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 885 days.

(21) Appl. No.: 10/445,110

(22) Filed: May 23, 2003

(65) Prior Publication Data

US 2003/0223580 A1 Dec. 4, 2003

Related U.S. Application Data

(60) Provisional application No. 60/383,252, filed on May 23, 2002.

(51) Int. Cl.
| | |
|---|---|
| *H04K 1/00* | (2006.01) |
| *H04L 9/00* | (2006.01) |
| *H04L 9/30* | (2006.01) |
| *H04L 9/06* | (2006.01) |
| *H04L 9/14* | (2006.01) |

(52) U.S. Cl. .......................... 380/28; 380/30; 380/44; 380/263; 380/277; 380/286

(58) Field of Classification Search ................ 380/28, 380/30, 277, 286, 44
See application file for complete search history.

(56) References Cited

U.S. PATENT DOCUMENTS

| | | | |
|---|---|---|---|
| 4,776,011 A | 10/1988 | Busby | 380/37 |
| 5,740,249 A | 4/1998 | Shimizu et al. | 380/28 |
| 5,778,074 A | 7/1998 | Garcken et al. | 380/37 |
| 6,014,442 A | 1/2000 | Enari | 380/4 |
| 6,185,304 B1 | 2/2001 | Coppersmith et al. | 380/37 |
| 6,192,129 B1 | 2/2001 | Coppersmith et al. | 380/259 |
| 6,246,768 B1 | 6/2001 | Kim | 380/28 |

(Continued)

FOREIGN PATENT DOCUMENTS

| | | |
|---|---|---|
| EP | 1246389 A1 * | 10/2002 |
| GB | 2 345 229 | 6/2000 |

OTHER PUBLICATIONS

Sever, R. et al.; "A high speed FPGA implementation of the Rijndael Algorithm"; Digital System Design, 2004. DSD 2004. Euromicro Symposium on Aug. 31-Sep. 3, 2004; pp. 358-362.*

(Continued)

*Primary Examiner*—Matthew Smithers
*Assistant Examiner*—Courtney D. Fields
(74) *Attorney, Agent, or Firm*—Schneck & Schneck; Thomas Schneck

(57) ABSTRACT

A cryptographic method and related implements the Rijndael—AES encryption standard. In one improvement, the decryption round keys are generated on a round by round basis from the final Nk round keys saved from a previous encryption key scheduling operation. Latency and memory requirements are thereby minimized. S-boxes for the AES key generation and cipher operation itself, may be implemented multiple times in different ways with different power signatures, with a pseudo-random selection of the pathway for the different bytes to be substituted. The premix operation occurs simultaneously with the generation of first round keys, and a dummy circuit with substantially identical timing as the real premix circuitry adds power consumption noise to the premix.

6 Claims, 24 Drawing Sheets

U.S. PATENT DOCUMENTS

| | | |
|---|---|---|
| 6,278,783 B1 | 8/2001 | Kocher et al. ............... 380/277 |
| 6,295,606 B1 | 9/2001 | Messerges et al. .......... 713/189 |
| 6,327,661 B1 | 12/2001 | Kocher et al. ............... 713/193 |
| 6,937,727 B2* | 8/2005 | Yup et al. ..................... 380/28 |
| 2001/0024502 A1 | 9/2001 | Ohkuma et al. ............... 380/46 |
| 2002/0027987 A1 | 3/2002 | Roelse ........................ 380/29 |

OTHER PUBLICATIONS

T. Wollinger et al., "Security on FPGAs: State-of-the-art Implementations and Attacks", ACM Transactions on Embedded Computing Systems (TECS), vol. 3, Issue 3, Aug. 2004, pp. 534-574.*

J. Daemen et al., "Resistance Against Implementation Attacks A Comparative Study of the AES Proposals", Feb. 1, 1999, 11 pages.

E. Biham et al., "Power Analysis of the Key Scheduling of the AES Candidates", 7 pages, date unknown.

National Institute of Standards and Technology, "Recommendation for Block Cipher Modes of Operation", Special Publ. 800-38A, 2001 Edition, Dec. 2001, pp. 1-59.

Federal Information Processing Standards Publication 197, "Advanced Encryption Standard (AES)", Nov. 26, 2001, pp. 1-47.

* cited by examiner

| S-box | | y | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | a | b | c | d | e | f |
| x | 0 | 63 | 7c | 77 | 7b | f2 | 6b | 6f | c5 | 30 | 01 | 67 | 2b | fe | d7 | ab | 76 |
| | 1 | ca | 82 | c9 | 7d | fa | 59 | 47 | f0 | ad | d4 | a2 | af | 9c | a4 | 72 | c0 |
| | 2 | b7 | fd | 93 | 26 | 36 | 3f | f7 | cc | 34 | a5 | e5 | f1 | 71 | d8 | 31 | 15 |
| | 3 | 04 | c7 | 23 | c3 | 18 | 96 | 05 | 9a | 07 | 12 | 80 | e2 | eb | 27 | b2 | 75 |
| | 4 | 09 | 83 | 2c | 1a | 1b | 6e | 5a | a0 | 52 | 3b | d6 | b3 | 29 | e3 | 2f | 84 |
| | 5 | 53 | d1 | 00 | ed | 20 | fc | b1 | 5b | 6a | cb | be | 39 | 4a | 4c | 58 | cf |
| | 6 | d0 | ef | aa | fb | 43 | 4d | 33 | 85 | 45 | f9 | 02 | 7f | 50 | 3c | 9f | a8 |
| | 7 | 51 | a3 | 40 | 8f | 92 | 9d | 38 | f5 | bc | b6 | da | 21 | 10 | ff | f3 | d2 |
| | 8 | cd | 0c | 13 | ec | 5f | 97 | 44 | 17 | c4 | a7 | 7e | 3d | 64 | 5d | 19 | 73 |
| | 9 | 60 | 81 | 4f | dc | 22 | 2a | 90 | 88 | 46 | ee | b8 | 14 | de | 5e | 0b | db |
| | a | e0 | 32 | 3a | 0a | 49 | 06 | 24 | 5c | c2 | d3 | ac | 62 | 91 | 95 | e4 | 79 |
| | b | e7 | c8 | 37 | 6d | 8d | d5 | 4e | a9 | 6c | 56 | f4 | ea | 65 | 7a | ae | 08 |
| | c | ba | 78 | 25 | 2e | 1c | a6 | b4 | c6 | e8 | dd | 74 | 1f | 4b | bd | 8b | 8a |
| | d | 70 | 3e | b5 | 66 | 48 | 03 | f6 | 0e | 61 | 35 | 57 | b9 | 86 | c1 | 1d | 9e |
| | e | e1 | f8 | 98 | 11 | 69 | d9 | 8e | 94 | 9b | 1e | 87 | e9 | ce | 55 | 28 | df |
| | f | 8c | a1 | 89 | 0d | bf | e6 | 42 | 68 | 41 | 99 | 2d | 0f | b0 | 54 | bb | 16 |

*FIG. 1 (Prior Art)*

| XOR | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 0 | 1 | 2 | 3 | 4 | 5 | 6 | 7 | 8 | 9 | a | b | c | d | e | f |
| 1 | 1 | 0 | 3 | 2 | 5 | 4 | 7 | 6 | 9 | 8 | b | a | d | c | f | e |
| 2 | 2 | 3 | 0 | 1 | 6 | 7 | 4 | 5 | a | b | 8 | 9 | e | f | c | d |
| 3 | 3 | 2 | 1 | 0 | 7 | 6 | 5 | 4 | b | a | 9 | 8 | f | e | d | c |
| 4 | 4 | 5 | 6 | 7 | 0 | 1 | 2 | 3 | c | d | e | f | 8 | 9 | a | b |
| 5 | 5 | 4 | 7 | 6 | 1 | 0 | 3 | 2 | d | c | f | e | 9 | 8 | b | a |
| 6 | 6 | 7 | 4 | 5 | 2 | 3 | 0 | 1 | e | f | c | d | a | b | 8 | 9 |
| 7 | 7 | 6 | 5 | 4 | 3 | 2 | 1 | 0 | f | e | d | c | b | a | 9 | 8 |
| 8 | 8 | 9 | a | b | c | d | e | f | 0 | 1 | 2 | 3 | 4 | 5 | 6 | 7 |
| 9 | 9 | 8 | b | a | d | c | f | e | 1 | 0 | 3 | 2 | 5 | 4 | 7 | 6 |
| a | a | b | 8 | 9 | e | f | c | d | 2 | 3 | 0 | 1 | 6 | 7 | 4 | 5 |
| b | b | a | 9 | 8 | f | e | d | c | 3 | 2 | 1 | 0 | 7 | 6 | 5 | 4 |
| c | c | d | e | f | 8 | 9 | a | b | 4 | 5 | 6 | 7 | 0 | 1 | 2 | 3 |
| d | d | c | f | e | 9 | 8 | b | a | 5 | 4 | 7 | 6 | 1 | 0 | 3 | 2 |
| e | e | f | c | d | a | b | 8 | 9 | 6 | 7 | 4 | 5 | 2 | 3 | 0 | 1 |
| f | f | e | d | c | b | a | 9 | 8 | 7 | 6 | 5 | 4 | 3 | 2 | 1 | 0 |

*FIG. 2 (Prior Art)*

Cipher Key = 2b 7e 15 16 28 ae d2 a6 ab f7 15 88 09 cf 4f 3c
$w_0$ = 2b7e1516   $w_1$ = 28aed2a6   $w_2$ = abf71588   $w_3$ = 09cf4f3c

| i | temp = w[i − 1] | temp after RotWord() | temp after SubWord() | Rcon[i/Nk] | Temp after XOR with Rcon | w[i − Nk] | w[i] = temp XOR w[i − Nk] |
|---|---|---|---|---|---|---|---|
| 4 | 09cf4f3c | cf4f3c09 | 8a84eb01 | 01000000 | 8b84eb01 | 2b7e1516 | a0fafe17 |
| 5 | a0fafe17 | | | | | 28aed2a6 | 88542cb1 |
| 6 | 88542cb1 | | | | | abf71588 | 23a33939 |
| 7 | 23a33939 | | | | | 09cf4f3c | 2a6c7605 |
| 8 | 2a6c7605 | 6c76052a | 50386be5 | 02000000 | 52386be5 | a0fafe17 | f2c295f2 |
| 9 | f2c295f2 | | | | | 88542cb1 | 7a96b943 |
| 10 | 7a96b943 | | | | | 23a33939 | 5935807a |
| 11 | 5935807a | | | | | 2a6c7605 | 7359f67f |
| 12 | 7359f67f | 59f67f73 | cb42d28f | 04000000 | cf42d28f | f2c295f2 | 3d80477d |
| 13 | 3d80477d | | | | | 7a96b943 | 4716fe3e |
| 14 | 4716fe3e | | | | | 5935807a | 1e237e44 |
| 15 | 1e237e44 | | | | | 7359f67f | 6d7a883b |
| 16 | 6d7a883b | 7a883b6d | dac4e23c | 08000000 | d2c4e23c | 3d80477d | ef44a541 |
| 17 | ef44a541 | | | | | 4716fe3e | a8525b7f |
| 18 | a8525b7f | | | | | 1e237e44 | b671253b |

| | | | | | |
|---|---|---|---|---|---|
| 19 | b671253b | | | | 6d7a883b | db0bad00 |
| 20 | db0bad00 | 0bad00db | 2b9563b9 | 10000000 | 3b9563b9 | ef44a541 | d4d1c6f8 |
| 21 | d4d1c6f8 | | | | | a8525b7f | 7c839d87 |
| 22 | 7c839d87 | | | | | b671253b | caf2b8bc |
| 23 | caf2b8bc | | | | | db0bad00 | 11f915bc |
| 24 | 11f915bc | f915bc11 | 99596582 | 20000000 | b9596582 | d4d1c6f8 | 6d88a37a |
| 25 | 6d88a37a | | | | | 7c839d87 | 110b3efd |
| 26 | 110b3efd | | | | | caf2b8bc | dbf98641 |
| 27 | dbf98641 | | | | | 11f915bc | ca0093fd |
| 28 | ca0093fd | 0093fdca | 63dc5474 | 40000000 | 23dc5474 | 6d88a37a | 4e54f70e |
| 29 | 4e54f70e | | | | | 110b3efd | 5f5fc9f3 |
| 30 | 5f5fc9f3 | | | | | dbf98641 | 84a64fb2 |
| 31 | 84a64fb2 | | | | | ca0093fd | 4ea6dc4f |
| 32 | 4ea6dc4f | a6dc4f4e | 2486842f | 80000000 | a486842f | 4e54f70e | ead27321 |
| 33 | ead27321 | | | | | 5f5fc9f3 | b58dbad2 |
| 34 | b58dbad2 | | | | | 84a64fb2 | 312bf560 |
| 35 | 312bf560 | | | | | 4ea6dc4f | 7f8d292f |
| 36 | 7f8d292f | 8d292f7f | 5da515d2 | 1b000000 | 46a515d2 | ead27321 | ac7766f3 |
| 37 | ac7766f3 | | | | | b58dbad2 | 19fadc21 |
| 38 | 19fadc21 | | | | | 312bf560 | 28d12941 |
| 39 | 28d12941 | | | | | 7f8d292f | 575c006e |
| 40 | 575c006e | 5c006e57 | 4a639f5b | 36000000 | 7c639f5b | ac7766f3 | d014f9a8 |
| 41 | d014f9a8 | | | | | 19fadc21 | c9ee2589 |
| 42 | c9ee2589 | | | | | 28d12941 | e13f0cc8 |
| 43 | e13f0cc8 | | | | | 575c006e | b6630ca6 |

FIG. 3B (Prior Art)

$w_{43} = \text{b6630ca6}$  $w_{42} = \text{e13f0cc8}$  $w_{41} = \text{c9ee2589}$  $w_{40} = \text{d014f9a8}$

| i | temp = w[i-1] | temp after RotWord() | temp after SubWord() | Rcon[i/Nk] | temp after XOR with Rcon | w[i] | w[i-Nk] = temp XOR w[i] | i - Nk |
|---|---|---|---|---|---|---|---|---|
| 43 | e13f0cc8 | | | | | b6630ca6 | 575c006e | 39 |
| 42 | c9ee2589 | | | | | e13f0cc8 | 28d12941 | 38 |
| 41 | d014f9a8 | | | | | c9ee2589 | 19fadc21 | 37 |
| 40 | 575c006e | 5c006e57 | 4a639f5b | 36000000 | 7c639f5b | d014f9a8 | ac7766f3 | 36 |
| 39 | 28d12941 | | | | | 575c006e | 7f8d292f | 35 |
| 38 | 19fadc21 | | | | | 28d12941 | 312bf560 | 34 |
| 37 | ac7766f3 | | | | | 19fadc21 | b58dbad2 | 33 |
| 36 | 7f8d292f | 8d292f7f | 5da515d2 | 1b000000 | 46a515d2 | ac7766f3 | ead27321 | 32 |
| 35 | 312bf560 | | | | | 7f8d292f | 4ea6dc4f | 31 |
| 34 | b58dbad2 | | | | | 312bf560 | 84a64fb2 | 30 |
| 33 | ead27321 | | | | | b58dbad2 | 5f5fc9f3 | 29 |
| 32 | 4ea6dc4f | a6dc4f4e | 2486842f | 80000000 | a486842f | ead27321 | 4e54f70e | 28 |
| 31 | 84a64fb2 | | | | | 4ea6dc4f | ca0093fd | 27 |
| 30 | 5f5fc9f3 | | | | | 84a64fb2 | dbf98641 | 26 |
| 29 | 4e54f70e | | | | | 5f5fc9f3 | 110b3efd | 25 |
| 28 | ca0093fd | 0093fdca | 63dc5474 | 40000000 | 23dc5474 | 4e54f70e | 6d88a37a | 24 |

Fig. 4A

| Fig. 4A |
|---|
| Fig. 4B |

Fig. 4

| | | | | | |
|---|---|---|---|---|---|
| 27 | dbf98641 | | | ca0093fd | 11f915bc | 23 |
| 26 | 110b3efd | | | dbf98641 | caf2b8bc | 22 |
| 25 | 6d88a37a | | | 110b3efd | 7c839d87 | 21 |
| 24 | 11f915bc | f915bc11 | 20000000 | 6d88a37a | d4d1c6f8 | 20 |
| 23 | caf2b8bc | | | 11f915bc | db0bad00 | 19 |
| 22 | 7c839d87 | | b9596582 | caf2b8bc | b671253b | 18 |
| 21 | d4d1c6f8 | | | 7c839d87 | a8525b7f | 17 |
| 20 | db0bad00 | 0bad00db | 10000000 | d4d1c6f8 | ef44a541 | 16 |
| 19 | b671253b | | | db0bad00 | 6d7a883b | 15 |
| 18 | a8525b7f | | 3b9563b9 | b671253b | 1e237e44 | 14 |
| 17 | ef44a541 | | | a8525b7f | 4716fe3e | 13 |
| 16 | 6d7a883b | 7a883b6d | 08000000 | ef44a541 | 3d80477d | 12 |
| 15 | 1e237e44 | | d2c4e23c | 6d7a883b | 7359f67f | 11 |
| 14 | 4716fe3e | | | 1e237e44 | 5935807a | 10 |
| 13 | 3d80477d | | | 4716fe3e | 7a96b943 | 9 |
| 12 | 7359f67f | 59f67f73 | 04000000 | 3d80477d | f2c295f2 | 8 |
| 11 | 5935807a | | cf42d28f | 7359f67f | 2a6c7605 | 7 |
| 10 | 7a96b943 | | | 5935807a | 23a33939 | 6 |
| 9 | f2c295f2 | | | 7a96b943 | 88542cb1 | 5 |
| 8 | 2a6c7605 | 6c76052a | 02000000 | f2c295f2 | a0fafe17 | 4 |
| 7 | 23a33939 | | 52386be5 | 2a6c7605 | 09cf4f3c | 3 |
| 6 | 88542cb1 | | | 23a33939 | abf71588 | 2 |
| 5 | a0fafe17 | | | 88542cb1 | 28aed2a6 | 1 |
| 4 | 09cf4f3c | cf4f3c09 | 01000000 | 8a84eb01 | 8b84eb01 | a0fafe17 | 2b7e1516 | 0 |

Cipher Key = 8e 73 b0 f7 da 0e 64 52 c8 10 f3 2b 80 90 79 e5 62 f8 ea d2 52 2c 6b 7b
$w_0$ = 8e73b0f7   $w_1$ = da0e6452   $w_2$ = c810f32b   $w_3$ = 809079e5
$w_4$ = 62f8ead2   $w_5$ = 522c6b7b

| i | temp = w[i−1] | temp after RotWord() | temp after SubWord() | Rcon[i/Nk] | Temp after XOR with Rcon | w[i − Nk] | w[i] = temp XOR w[i − Nk] |
|---|---|---|---|---|---|---|---|
| 6 | 522c6b7b | 2c6b7b52 | 717f2100 | 01000000 | 707f2100 | 8e73b0f7 | fe0c91f7 |
| 7 | fe0c91f7 | | | | | da0e6452 | 2402f5a5 |
| 8 | 2402f5a5 | | | | | c810f32b | ec12068e |
| 9 | ec12068e | | | | | 809079e5 | 6c827f6b |
| 10 | 6c827f6b | | | | | 62f8ead2 | 0e7a95b9 |
| 11 | 0e7a95b9 | | | | | 522c6b7b | 5c56fec2 |
| 12 | 5c56fec2 | 56fec25c | b1bb254a | 02000000 | b3bb254a | fe0c91f7 | 4db7b4bd |
| 13 | 4db7b4bd | | | | | 2402f5a5 | 69b54118 |
| 14 | 69b54118 | | | | | ec12068e | 85a74796 |
| 15 | 85a74796 | | | | | 6c827f6b | e92538fd |
| 16 | e92538fd | | | | | 0e7a95b9 | e75fad44 |
| 17 | e75fad44 | | | | | 5c56fec2 | bb095386 |
| 18 | bb095386 | 095386bb | 01ed44ea | 04000000 | 05ed44ea | 4db7b4bd | 485af057 |
| 19 | 485af057 | | | | | 69b54118 | 21efb14f |
| 20 | 21efb14f | | | | | 85a74796 | a448f6d9 |
| 21 | a448f6d9 | | | | | e92538fd | 4d6dce24 |
| 22 | 4d6dce24 | | | | | e75fad44 | aa326360 |
| 23 | aa326360 | | | | | bb095386 | 113b30e6 |
| 24 | 113b30e6 | 3b30e611 | e2048e82 | 08000000 | ea048e82 | 485af057 | a25e7ed5 |
| 25 | a25e7ed5 | | | | | 21efb14f | 83b1cf9a |

Fig. 5A (Prior Art)

| 26 | 83b1cf9a | | | | a448f6d9 | 27f93943 |
|---|---|---|---|---|---|---|
| 27 | 27f93943 | | | | 4d6dce24 | 6a94f767 |
| 28 | 6a94f767 | | | | aa326360 | c0a69407 |
| 29 | c0a69407 | | | | 113b30e6 | d19da4e1 |
| 30 | d19da4e1 | 9da4e1d1 | 5e49f83e | 10000000 | a25e7ed5 | ec1786eb |
| 31 | ec1786eb | | | 4e49f83e | 83b1cf9a | 6fa64971 |
| 32 | 6fa64971 | | | | 27f93943 | 485f7032 |
| 33 | 485f7032 | | | | 6a94f767 | 22cb8755 |
| 34 | 22cb8755 | | | | c0a69407 | e26d1352 |
| 35 | e26d1352 | | | | d19da4e1 | 33f0b7b3 |
| 36 | 33f0b7b3 | f0b7b333 | 8ca96dc3 | 20000000 | ec1786eb | 40beeb28 |
| 37 | 40beeb28 | | | aca96dc3 | 6fa64971 | 2f18a259 |
| 38 | 2f18a259 | | | | 485f7032 | 6747d26b |
| 39 | 6747d26b | | | | 22cb8755 | 458c553e |
| 40 | 458c553e | | | | e26d1352 | a7e1466c |
| 41 | a7e1466c | | | | 33f0b7b3 | 9411f1df |
| 42 | 9411f1df | 11f1df94 | 82a19e22 | 40000000 | 40beeb28 | 821f750a |
| 43 | 821f750a | | | c2a19e22 | 2f18a259 | ad07d753 |
| 44 | ad07d753 | | | | 6747d26b | ca400538 |
| 45 | ca400538 | | | | 458c553e | 8fcc5006 |
| 46 | 8fcc5006 | | | | a7e1466c | 282d166a |
| 47 | 282d166a | | | | 9411f1df | bc3ce7b5 |
| 48 | bc3ce7b5 | 3ce7b5bc | eb94d565 | 80000000 | 821f750a | e98ba06f |
| 49 | e98ba06f | | | 6b94d565 | ad07d753 | 448c773c |
| 50 | 448c773c | | | | ca400538 | 8ecc7204 |
| 51 | 8ecc7204 | | | | 8fcc5006 | 01002202 |

*Fig. 5B*
*Prior Art*

$w_{51}$ = 01002202  $w_{50}$ = 8ecc7204  $w_{49}$ = 448c773c  $w_{48}$ = e98ba06f
$w_{47}$ = bc3ce7b5  $w_{46}$ = 282d166a

| i | temp = w[i-1] | temp after RotWord() | temp after SubWord() | Rcon[i/Nk] | temp after XOR with Rcon | w[i] | w[i-Nk] = temp XOR w[i] | i – Nk |
|---|---|---|---|---|---|---|---|---|
| 51 | 8ecc7204 | | | | | 01002202 | 8fcc5006 | 45 |
| 50 | 448c773c | | | | | 8ecc7204 | ca400538 | 44 |
| 49 | e98ba06f | | | | | 448c773c | ad07d753 | 43 |
| 48 | bc3ce7b5 | 3ce7b5bc | eb94d565 | 80000000 | 6b94d565 | e98ba06f | 821f750a | 42 |
| 47 | 282d166a | | | | | bc3ce7b5 | 9411f1df | 41 |
| 46 | 8fcc5006 | | | | | 282d166a | a7e1466c | 40 |
| 45 | ca400538 | | | | | 8fcc5006 | 458c553e | 39 |
| 44 | ad07d753 | | | | | ca400538 | 6747d26b | 38 |
| 43 | 821f750a | | | | | ad07d753 | 2f18a259 | 37 |
| 42 | 9411f1df | 11f1df94 | 82a19e22 | 40000000 | c2a19e22 | 821f750a | 40beeb28 | 36 |
| 41 | a7e1466c | | | | | 9411f1df | 33f0b7b3 | 35 |
| 40 | 458c553e | | | | | a7e1466c | e26d1352 | 34 |
| 39 | 6747d26b | | | | | 458c553e | 22cb8755 | 33 |
| 38 | 2f18a259 | | | | | 6747d26b | 485f7032 | 32 |
| 37 | 40beeb28 | | | | | 2f18a259 | 6fa64971 | 31 |
| 36 | 33f0b7b3 | f0b7b333 | 8ca96dc3 | 20000000 | aca96dc3 | 40beeb28 | ec1786eb | 30 |
| 35 | e26d1352 | | | | | 33f0b7b3 | d19da4e1 | 29 |
| 34 | 22cb8755 | | | | | e26d1352 | c0a69407 | 28 |
| 33 | 485f7032 | | | | | 22cb8755 | 6a94f767 | 27 |
| 32 | 6fa64971 | | | | | 485f7032 | 27f93943 | 26 |
| 31 | ec1786eb | | | | | 6fa64971 | 83b1cf9a | 25 |

| 30 | d19da4e1 | 9da4e1d1 | 5e49f83e | 10000000 | 4e49f83e | ec1786eb | a25e7ed5 | 24 |
|---|---|---|---|---|---|---|---|---|
| 29 | c0a69407 | | | | | d19da4e1 | 113b30e6 | 23 |
| 28 | 6a94f767 | | | | | c0a69407 | aa326360 | 22 |
| 27 | 27f93943 | | | | | 6a94f767 | 4d6dce24 | 21 |
| 26 | 83b1cf9a | | | | | 27f93943 | a448f6d9 | 20 |
| 25 | a25e7ed5 | | | | | 83b1cf9a | 21efb14f | 19 |
| 24 | 113b30e6 | 3b30e611 | e2048e82 | 08000000 | ea048e82 | a25e7ed5 | 485af057 | 18 |
| 23 | aa326360 | | | | | 113b30e6 | bb095386 | 17 |
| 22 | 4d6dce24 | | | | | aa326360 | e75fad44 | 16 |
| 21 | a448f6d9 | | | | | 4d6dce24 | e92538fd | 15 |
| 20 | 21efb14f | | | | | a448f6d9 | 85a74796 | 14 |
| 19 | 485af057 | | | | | 21efb14f | 69b54118 | 13 |
| 18 | bb095386 | 095386bb | 01ed44ea | 04000000 | 05ed44ea | 485af057 | 4db7b4bd | 12 |
| 17 | e75fad44 | | | | | bb095386 | 5c56fec2 | 11 |
| 16 | e92538fd | | | | | e75fad44 | 0e7a95b9 | 10 |
| 15 | 85a74796 | | | | | e92538fd | 6c827f6b | 9 |
| 14 | 69b54118 | | | | | 85a74796 | ec12068e | 8 |
| 13 | 4db7b4bd | | | | | 69b54118 | 2402f5a5 | 7 |
| 12 | 5c56fec2 | 56fec25c | b1bb254a | 02000000 | b3bb254a | 4db7b4bd | fe0c91f7 | 6 |
| 11 | 0e7a95b9 | | | | | 5c56fec2 | 522c6b7b | 5 |
| 10 | 6c827f6b | | | | | 0e7a95b9 | 62f8ead2 | 4 |
| 9 | ec12068e | | | | | 6c827f6b | 809079e5 | 3 |
| 8 | 2402f5a5 | | | | | ec12068e | c810f32b | 2 |
| 7 | fe0c91f7 | | | | | 2402f5a5 | da0e6452 | 1 |
| 6 | 522c6b7b | 2c6b7b52 | 717f2100 | 01000000 | 707f2100 | fe0c91f7 | 8e73b0f7 | 0 |

*Fig. 6B*

Cipher Key = 60 3d eb 10 15 ca 71 be 2b 73 ae f0 85 7d 77 81 1f 35 2c 07 3b 61 08 d7 2d 98 10 a3 09 14 df f4

$w_0$ = 603deb10  $w_1$ = 15ca71be  $w_2$ = 2b73aef0  $w_3$ = 857d7781
$w_4$ = 1f352c07  $w_5$ = 3b6108d7  $w_6$ = 2d9810a3  $w_7$ = 0914dff4

| i | temp = w[i−1] | temp after RotWord() | temp after SubWord() | Rcon[i/Nk] | Temp after XOR with Rcon | w[i − Nk] | w[i] = temp XOR w[i − Nk] |
|---|---|---|---|---|---|---|---|
| 8 | 0914dff4 | 14dff409 | fa9ebf01 | 01000000 | fb9ebf01 | 603deb10 | 9ba35411 |
| 9 | 9ba35411 | | | | | 15ca71be | 8e6925af |
| 10 | 8e6925af | | | | | 2b73aef0 | a51a8b5f |
| 11 | a51a8b5f | | | | | 857d7781 | 2067fcde |
| 12 | 2067fcde | | b785b01d | | | 1f352c07 | a8b09c1a |
| 13 | a8b09c1a | | | | | 3b6108d7 | 93d194cd |
| 14 | 93d194cd | | | | | 2d9810a3 | be49846e |
| 15 | be49846e | | | | | 0914dff4 | b75d5b9a |
| 16 | b75d5b9a | 5d5b9ab7 | 4c39b8a9 | 02000000 | 4e39b8a9 | 9ba35411 | d59aecb8 |
| 17 | d59aecb8 | | | | | 8e6925af | 5bf3c917 |
| 18 | 5bf3c917 | | | | | a51a8b5f | fee94248 |
| 19 | fee94248 | | | | | 2067fcde | de8ebe96 |
| 20 | de8ebe96 | | 1d19ae90 | | | a8b09c1a | b5a9328a |
| 21 | b5a9328a | | | | | 93d194cd | 2678a647 |
| 22 | 2678a647 | | | | | be49846e | 98312229 |
| 23 | 98312229 | | | | | b75d5b9a | 2f6c79b3 |
| 24 | 2f6c79b3 | 6c79b32f | 50b66d15 | 04000000 | 54b66d15 | d59aecb8 | 812c81ad |
| 25 | 812c81ad | | | | | 5bf3c917 | dadf48ba |
| 26 | dadf48ba | | | | | fee94248 | 24360af2 |

| 27 | 24360af2 | | | | | de8ebe96 | fab8b464 |
|---|---|---|---|---|---|---|---|
| 28 | fab8b464 | 2d6c8d43 | | | | b5a9328a | 98c5bfc9 |
| 29 | 98c5bfc9 | | | | | 2678a647 | bebd198e |
| 30 | bebd198e | | | | | 98312229 | 268c3ba7 |
| 31 | 268c3ba7 | | | | | 2f6c79b3 | 09e04214 |
| 32 | 09e04214 | e0421409 | e12cfa01 | 08000000 | e92cfa01 | 812c81ad | 68007bac |
| 33 | 68007bac | | | | | dadf48ba | b2df3316 |
| 34 | b2df3316 | | | | | 24360af2 | 96e939e4 |
| 35 | 96e939e4 | | | | | fab8b464 | 6c518d80 |
| 36 | 6c518d80 | | 50d15dcd | | | 98c5bfc9 | c814e204 |
| 37 | c814e204 | | | | | bebd198e | 76a9fb8a |
| 38 | 76a9fb8a | | | | | 268c3ba7 | 5025c02d |
| 39 | 5025c02d | | | | | 09e04214 | 59c58239 |
| 40 | 59c58239 | c5823959 | a61312cb | 10000000 | b61312cb | 68007bac | de136967 |
| 41 | de136967 | | | | | b2df3316 | 6ccc5a71 |
| 42 | 6ccc5a71 | | | | | 96e939e4 | fa256395 |
| 43 | fa256395 | | | | | 6c518d80 | 9674ee15 |
| 44 | 9674ee15 | 90922859 | | | | c814e204 | 5886ca5d |
| 45 | 5886ca5d | | | | | 76a9fb8a | 2e2f31d7 |
| 46 | 2e2f31d7 | | | | | 5025c02d | 7e0af1fa |
| 47 | 7e0af1fa | | | | | 59c58239 | 27cf73c3 |
| 48 | 27cf73c3 | cf73c327 | 8a8f2ecc | 20000000 | aa8f2ecc | de136967 | 749c47ab |

*Fig. 7B (Prior Art)*

| | | | | |
|---|---|---|---|---|
| 49 | 749c47ab | | | 6ccc5a71 | 18501dda |
| 50 | 18501dda | | | fa256395 | e2757e4f |
| 51 | e2757e4f | | | 9674ee15 | 7401905a |
| 52 | 7401905a | 927c60be | | 5886ca5d | cafaaae3 |
| 53 | cafaaae3 | | | 2e2f31d7 | e4d59b34 |
| 54 | e4d59b34 | | | 7e0af1fa | 9adf6ace |
| 55 | 9adf6ace | | | 27cf73c3 | bd10190d |
| 56 | bd10190d | 10190dbd | cad4d77a | 40000000 | 8ad4d77a | 749c47ab | fe4890d1 |
| 57 | fe4890d1 | | | 18501dda | e6188d0b |
| 58 | e6188d0b | | | e2757e4f | 046df344 |
| 59 | 046df344 | | | 7401905a | 706c631e |

*Fig. 7C (Prior Art)*

$w_{59} = 706c631e$  $w_{58} = 046df344$  $w_{57} = e6188d0b$  $w_{56} = fe4890d1$
$w_{55} = bd10190d$  $w_{54} = 9adf6ace$  $w_{53} = e4d59b34$  $w_{52} = cafaaae3$

| i | temp = w[i-1] | temp after RotWord() | temp after SubWord() | Rcon[i/Nk] | temp after XOR with Rcon | w[i] | w[i-Nk] = temp XOR w[i] | i – Nk |
|---|---|---|---|---|---|---|---|---|
| 59 | 046df344 | | | | | | 7401905a | 51 |
| 58 | e6188f0b | | | | | 046df344 | e2757e4f | 50 |
| 57 | fe4890d1 | | | | | e6188f0b | 18501dda | 49 |
| 56 | bd10190d | 10190dbd | cad4d77a | 40000000 | 8ad4d77a | fe4890d1 | 749c47ab | 48 |
| 55 | 9adf6ace | | | | | bd10190d | 27cf73c3 | 47 |
| 54 | e4d59b34 | | | | | 9adf6ace | 7e0af1fa | 46 |
| 53 | cafaaae3 | | | | | e4d59b34 | 2e2f31d7 | 45 |
| 52 | 7401905a | | 927c60be | | | cafaaae3 | 5886ca5d | 44 |
| 51 | e2757e4f | | | | | 7401905a | 9674ee15 | 43 |
| 50 | 18501dda | | | | | e2757e4f | fa256395 | 42 |
| 49 | 749c47ab | | | | | 18501dda | 6ccc5a71 | 41 |
| 48 | 27cf73c3 | cf73c327 | 8a8f2ecc | 20000000 | aa8f2ecc | 749c47ab | de136967 | 40 |
| 47 | 7e0af1fa | | | | | 27cf73c3 | 59c58239 | 39 |
| 46 | 2e2f31d7 | | | | | 7e0af1fa | 5025c02d | 38 |
| 45 | 5886ca5d | | 90922859 | | | 2e2f31d7 | 76a9fb8a | 37 |
| 44 | 9674ee15 | | | | | 5886ca5d | c814e204 | 36 |
| 43 | fa256395 | | | | | 9674ee15 | 6c518d80 | 35 |
| 42 | 6ccc5a71 | | | | | fa256395 | 96e939e4 | 34 |
| 41 | de136967 | | | | | 6ccc5a71 | b2df3316 | 33 |

| | | | | | | |
|---|---|---|---|---|---|---|
| 40 | 59c58239 | c5823959 | a61312cb | 10000000 | b61312cb | de136967 | 68007bac | 32 |
| 39 | 5025c02d | | | | | 59c58239 | 09e04214 | 31 |
| 38 | 76a9fb8a | | | | | 5025c02d | 268c3ba7 | 30 |
| 37 | c814e204 | | 50d15dcd | | | 76a9fb8a | bebd198e | 29 |
| 36 | 6c518d80 | | | | | c814e204 | 98c5bfc9 | 28 |
| 35 | 96e939e4 | | | | | 6c518d80 | fab8b464 | 27 |
| 34 | b2df3316 | | | | | 96e939e4 | 24360af2 | 26 |
| 33 | 68007bac | | | | | b2df3316 | dadf48ba | 25 |
| 32 | 09e04214 | e0421409 | e12cfa01 | 08000000 | e92cfa01 | 68007bac | 812c81ad | 24 |
| 31 | 268c3ba7 | | | | | 09e04214 | 2f6c79b3 | 23 |
| 30 | bebd198e | | | | | 268c3ba7 | 98312229 | 22 |
| 29 | 98c5bfc9 | | | | | bebd198e | 2678a647 | 21 |
| 28 | fab8b464 | | 2d6c8d43 | | | 98c5bfc9 | b5a9328a | 20 |
| 27 | 24360af2 | | | | | fab8b464 | de8ebe96 | 19 |
| 26 | dadf48ba | | | | | 24360af2 | fee94248 | 18 |
| 25 | 812c81ad | | | | | dadf48ba | 5bf3c917 | 17 |
| 24 | 2f6c79b3 | 6c79b32f | 50b66d15 | 04000000 | 54b66d15 | 812c81ad | d59aecb8 | 16 |
| 23 | 98312229 | | | | | 2f6c79b3 | b75d5b9a | 15 |
| 22 | 2678a647 | | | | | 98312229 | be49846e | 14 |
| 21 | b5a9328a | | 1d19ae90 | | | 2678a647 | 93d194cd | 13 |
| 20 | de8ebe96 | | | | | b5a9328a | a8b09c1a | 12 |
| 19 | fee94248 | | | | | de8ebe96 | 2067fcde | 11 |
| 18 | 5bf3c917 | | | | | fee94248 | a51a8b5f | 10 |
| 17 | d59aecb8 | | | | | 5bf3c917 | 8e6925af | 9 |

Fig. 8B

| 16 | b75d5b9a | 5d5b9ab7 | 4c39b8a9 | 02000000 | 4e39b8a9 | d59aecb8 | 9ba35411 | 8 |
|----|----------|----------|----------|----------|----------|----------|----------|---|
| 15 | be49846e |          |          |          |          | b75d5b9a | 0914dff4 | 7 |
| 14 | 93d194cd |          |          |          |          | be49846e | 2d9810a3 | 6 |
| 13 | a8b09c1a |          | b785b01d |          |          | 93d194cd | 3b6108d7 | 5 |
| 12 | 2067fcde |          |          |          |          | a8b09c1a | 1f352c07 | 4 |
| 11 | a51a8b5f |          |          |          |          | 2067fcde | 857d7781 | 3 |
| 10 | 8e6925af |          |          |          |          | a51a8b5f | 2b73aef0 | 2 |
| 9  | 9ba35411 |          |          |          |          | 8e6925af | 15ca71be | 1 |
| 8  | 0914dff4 | 14dff409 | fa9ebf01 | 01000000 | fb9ebf01 | 9ba35411 | 603deb10 | 0 |

| LFSR Output (9-bit range) n | S-Box Order | SEL | | | | SEL⁻¹ | | | |
|---|---|---|---|---|---|---|---|---|---|
| | | 3 | 2 | 1 | 0 | 3 | 2 | 1 | 0 |
| 1EB-1FF | 3210 | 11 | 10 | 01 | 00 | 11 | 10 | 01 | 00 |
| 1D6-1EA | 3201 | 11 | 10 | 00 | 01 | 11 | 10 | 00 | 01 |
| 1C1-1D5 | 3120 | 11 | 01 | 10 | 00 | 11 | 01 | 10 | 00 |
| 1AB-1C0 | 3102 | 11 | 01 | 00 | 10 | 11 | 00 | 10 | 01 |
| 196-1AA | 3021 | 11 | 00 | 10 | 01 | 11 | 01 | 00 | 10 |
| 181-195 | 3012 | 11 | 00 | 01 | 10 | 11 | 00 | 01 | 10 |
| 16C-180 | 2301 | 10 | 11 | 00 | 01 | 10 | 11 | 00 | 01 |
| 157-16B | 2310 | 10 | 11 | 01 | 00 | 10 | 11 | 01 | 00 |
| 141-156 | 2031 | 10 | 00 | 11 | 01 | 01 | 11 | 00 | 10 |
| 12C-140 | 2013 | 10 | 00 | 01 | 11 | 00 | 11 | 01 | 10 |
| 117-12B | 2130 | 10 | 01 | 11 | 00 | 01 | 11 | 10 | 00 |
| 101-116 | 2103 | 10 | 01 | 00 | 11 | 00 | 11 | 10 | 01 |
| 0EC-100 | 1032 | 01 | 00 | 11 | 10 | 01 | 00 | 11 | 10 |
| 0D6-0EB | 1023 | 01 | 00 | 10 | 11 | 00 | 01 | 11 | 10 |
| 0C0-0D5 | 1302 | 01 | 11 | 01 | 10 | 10 | 00 | 11 | 01 |
| 0AB-0BF | 1320 | 01 | 11 | 10 | 00 | 10 | 01 | 11 | 00 |
| 096-0AA | 1230 | 01 | 10 | 11 | 00 | 01 | 10 | 11 | 00 |
| 081-095 | 1203 | 01 | 10 | 00 | 11 | 00 | 10 | 11 | 01 |
| 06B-080 | 0321 | 00 | 11 | 10 | 01 | 10 | 01 | 00 | 11 |
| 056-06A | 0312 | 00 | 11 | 01 | 10 | 10 | 00 | 01 | 11 |
| 040-055 | 0132 | 00 | 01 | 11 | 10 | 01 | 00 | 10 | 11 |
| 02B-03F | 0123 | 00 | 01 | 10 | 11 | 00 | 01 | 10 | 11 |
| 015-02A | 0231 | 00 | 10 | 11 | 01 | 01 | 10 | 00 | 11 |
| 000-014 | 0213 | 00 | 10 | 01 | 11 | 00 | 10 | 01 | 11 |

*FIG. 12*

ADVANCED ENCRYPTION STANDARD (AES) HARDWARE CRYPTOGRAPHIC ENGINE

CROSS-REFERENCE TO RELATED APPLICATION

This application claims the benefit under 35 U.S.C. 119(e) of prior U.S. Provisional Application No. 60/383,252, filed May 23, 2002.

TECHNICAL FIELD

The present invention relates to cryptographic methods and apparatus, and especially to the particular symmetric key block cipher algorithm known as Rijndael or AES and its associated hardware or software implementations. The invention relates in particular to round key generation for that algorithm in both the encryption and decryption directions, and also to techniques for thwarting differential power analysis attacks upon the implementing hardware or software in an attempt to discover the cipher key.

BACKGROUND ART

The U.S. Department of Commerce, National Institute of Standards and Technology (NIST) has adopted a subset of the Rijndael symmetric key block cipher algorithm for its Advanced Encryption Standard (AES), as specified in "Federal Information Processing Standards Publication 197" (FIPS 197), of Nov. 26, 2001. The AES algorithm uses cryptographic keys of 128, 192 and 256 bits to encrypt and decrypt data in blocks of 128 bits. The Rijndael algorithm is also capable of handling 192 and 256 bit blocks and supports extensions to certain intermediate or potentially larger key lengths and block sizes, with operations defined between any of its key lengths and block sizes.

The algorithm iterates a number of nearly identical rounds depending on key length and block size. AES128 uses 10 rounds, AES192 uses 12 rounds and AES256 uses 14 rounds to complete an encryption or decryption operation. More generally, for a key length of Nk 32-bit words and a block size of Nb 32-bit words, the number of rounds, Nr, for the Rijndael algorithm is presently specified as: Nr=max(Nk, Nb)+6.

The invention described herein is applicable to any of the Rijndael key lengths and block sizes, including the 128-bit block size specified for AES, and is also applicable to any mode of operation. The remainder of the patent specification will refer to the preferred AES embodiment, with the understanding that extension to any of the other Rijndael block sizes is also implied.

NIST Special Publication 800-38A, "Recommendation for Block Cipher Modes of Operation: Methods and Techniques", by Morris Dworkin (December 2001) specifies five confidentiality modes of operation approved by NIST for use in conjunction with any underlying symmetric key block cipher algorithm, such as AES. Other possible modes of operation are also under consideration for NIST approval. The invention described herein is applicable to any of the modes of operation.

In AES, three main steps occur during each round: (a) the text block is modified, (b) the round key is generated, and (c) the modified text block and the round key are added together using an XOR operation to provide the starting text block for the next round. With two exceptions, the text block is modified the same way in each round (S-box substitution, row shifting, column mixing). The first exception is a pre key mix operation (round 0) in which the plaintext message blocks are bitwise XORed with an initial round key filled with the first Nb words from the cipher key itself. (Nb=4 for AES) This pre key mix operation provides the starting text for round 1. The second exception occurs in the final round, in which the column mixing operation is omitted. The details of the S-box substitution, row shifting and column mixing operations for the rounds are described in the aforementioned FIPS 197 document.

The set of round keys (key schedule) is generated from the initial cipher key using a key expansion routine. In AES, the length of the round keys is always the same as the block size (128 bits=4 words) regardless of the length (128, 192 or 256 bits) of the original cipher key. The words of the cipher key are used in the early rounds while they last; then each successive round key word is a function of the preceding round key words. The calculation of the round keys by the key expansion routine is slightly different for each cipher key length, in that, while the same basic steps (S-box substitution, byte rotation, and XOR with a round constant) are used in each case, they occur with different frequencies for the different key lengths.

For a straightforward way of doing decryption, the individual cipher transformations can be inverted and implemented in reverse order from encryption. The form of the key schedules for the encryption and decryption operations remains the same, but are applied in reverse order. Thus, the first round key for decryption is the same as the last round key from the encryption, the second decryption round key is the same as the next-to-last round key from the encryption, etc.

One common approach to key scheduling is to pre-calculate in advance all of the round keys needed for a communication session, and then to save them as a key table in memory to be retrieved as needed for each round. This approach has a large initial latency period while the set of round keys are computed, but has faster subsequent execution of the cryptographic rounds. Moreover, decryption rounds in this case are as fast as the encryption rounds. However, this approach assumes that there is sufficient memory capacity available to store the entire key schedule, and that the initial latency period is tolerable.

Another approach used in some hardware systems involves "on-the-fly" key scheduling, in which round keys are generated as needed on a round-by-round basis. Because this approach does not pre-process the entire key schedule, the initial latency period is avoided, at least in the forward cipher direction (encryption), and memory requirements for the round keys are substantially reduced. This is especially useful for devices that only need to do encryption and which have memory and processing limitations. However, in the reverse cipher direction (decryption), the round keys are needed in reverse. That is, the first round key for decryption is the same as the last round key from the encryption. Moreover, the round keys are functions of the preceding round keys. Existing "on-the-fly" key expansion methods have large latencies in the decryption direction, especially in the early decryption rounds, since for each round the "on-the-fly" key generator must recompute all the preceding round keys until the round key for the current decryption round is reached. If possible, an improved key generation routine is needed for the reverse direction that eliminates this latency.

When ciphers, like AES, are employed in real-world applications, they must first be implemented in hardware or software. An attacker may choose to exploit some weakness of the implementation, rather than trying to find a mathematical weakness in the cipher itself. This may be done through external monitoring of a cryptographic system during its operation to obtain information leaked about the internal operations that could be useful in determining the cipher key. Examples of implementation attacks of cryptographic systems include timing and power analysis attacks that exploit any key-dependent variations in the execution time or power consumption pattern. Known countermeasures to various implementation attacks generally include: tamper resistant chip packaging, physical shielding to block signal emissions, filtering of inputs and outputs, computational techniques to equalize or randomize timing of operations, making the instruction sequence independent of the cipher key or change from one execution to the next, and adding hardware noise to the power consumption pattern. For example, U.S. Pat. No. 6,327,661 to Kocher et al. describe countermeasures which incorporate unpredictable (random or pseudo-random) information into the cryptographic processing. Note, however, that not all of these possible defenses are applicable in every situation. For example, processing and memory constraints of smart cards with built-in cryptographic engines limit which of the many available countermeasures can be used. Additional implementation countermeasures are desired for smart cards and other processor or memory limited applications, particularly during the most vulnerable period when the plaintext is first processed.

Encryption and decryption are necessarily time consuming operations. The many transpositions and substitutions of data bits, bytes and words needed to transform plaintext blocks into ciphertext, and vice versa, require time to process. As block sizes and the number of rounds increases, the problem would tend to get worse, but for the corresponding increase in processing power of the hardware. Any time savings that could be taken advantage of in a given implementation would be advantageous, provided security is not compromised.

An object of the present invention is to provide a on-the-fly key scheduling method and associated hardware or software that can efficiently generate AES/Rijndael round keys in the reverse (decryption) direction.

Another object of the present invention is to provide a hardware implementation of the AES/Rijndael cipher that provides a countermeasure to power analysis attacks during the early stages of encryption, especially during the pre-key-mix stage (round 0) of the cipher.

Yet another object of the invention is to provide an AES/Rijndael implementation that reduces the number of total clock cycles required to process the cipher.

DISCLOSURE OF THE INVENTION

The above objects are met by a method for a key generator to generate AES round-key words w[i] "on-the-fly" in a reverse direction as needed on a round-by-round basis for use in a decrypt operation of the cipher algorithm. Preferably, the key generator is implemented as a hardware circuit, but it would also be implemented in software if desired. The reverse key generation is achieved by providing memory for storing a final set of Nk round-key words derived during an encrypt operation's key expansion in the forward direction. When the key generator circuit is then set for a decrypt operation, it derives preceding round-key words w[i−Nk] "on-the-fly" by an XOR logic operation involving stored round-key words w[i] and w[i−1], wherein w[i−1] is first modified by a transformation sequence prior to applying the XOR logic operation whenever i mod Nk=0 and also whenever both Nk>6 and i mod Nk=4. The transformation sequence upon w[i−1] is identical in the forward and reverse directions of the key expansion routine. The transformation sequence involves a cyclic byte shift, an S-box byte substitution and an XOR operation with a round constant whenever i mod Nk=0. The transformation sequence involves only an S-box byte substitution when Nk>6 and i mod Nk=4.

The objects of the invention are also met by a pre-mix dummy circuit that inserts pseudo-random noise into the overall power signature of the hardware block cipher circuit during an initial pre-mix XOR operation of the block cipher algorithm. This differential power analysis countermeasure hides the power signature from all XOR gate switching as plaintext is mixed with the cipher key prior to the first cipher encryption round. The pre-mix dummy circuit is active only during this initial pre-mix XOR operation and is characterized by a propagation delay that substantially matches that of the pre-mix subcircuit. The dummy circuit includes a pseudo-random generator and an XOR array. The pseudo-random generator may be, for example, a set of linear feedback shift registers. The XOR array has first inputs connected to outputs of the pseudo-random generator. Second inputs of the XOR array are connected to receive the same cipher key bits as said pre-mix subcircuit. Outputs of the XOR array feed back to the pseudo-random generator. The pseudo-random generator and XOR array of the dummy circuit may have a word width in bits identical to that of the pre-mix subcircuit.

The objects of the invention are also met, in a hardware block cipher circuit configured to perform a cipher algorithm having an initial pre-mix XOR operation that mixes plaintext with a cipher key prior to beginning a sequence of cipher encryption rounds to generate a ciphertext, by a method that combines the pre-mix operation with the first cipher encryption round, thereby reducing the number of clock cycles required to process the cipher algorithm by one round. This method pre-processes the cipher key to generate round-key words for the first cipher encryption round while plaintext is loaded. The pre-mix XOR operation also occurs as plaintext is being loaded. The first cipher encryption round is executed upon the loaded pre-mixed plaintext using the pre-generated first round-key words.

BRIEF DESCRIPTION OF THE DRAWINGS

FIG. 1 is a table of S-box substitution values for input byte xy specified for the AES/Rijndael encryption cipher.

FIG. 2 is a table of XOR operation results for a pair of hexadecimal operands.

FIG. 3 is a table showing a key expansion example of the prior art taken from FIPS-197 for a 128-bit cipher key in the encryption direction.

FIG. 4 is a table showing a key expansion example implemented by the present invention for the same 128-bit cipher key as in FIG. 3, but in the reverse (decryption) direction.

FIG. 5 is a table showing a key expansion example of the prior art taken from FIPS-197 for a 192-bit cipher key in the encryption direction.

FIG. 6 is a table showing a key expansion example implemented by the present invention for the same 192-bit cipher key as in FIG. 5, but in the reverse (decryption) direction.

FIG. 7 is a table showing a key expansion example of the prior art taken from FIPS-197 for a 256-bit cipher key in the encryption direction.

FIG. 8 is a table showing a key expansion example implemented by the present invention for the same 256-bit cipher key as in FIG. 6, but in the reverse (decryption) direction.

FIG. 12 is a look-up table for use in the control path of the embodiment of FIG. 11 for converting any of 256 random number inputs into 24 path permutation selections.

BEST MODE OF CARRYING OUT THE INVENTION

Figure 9A:
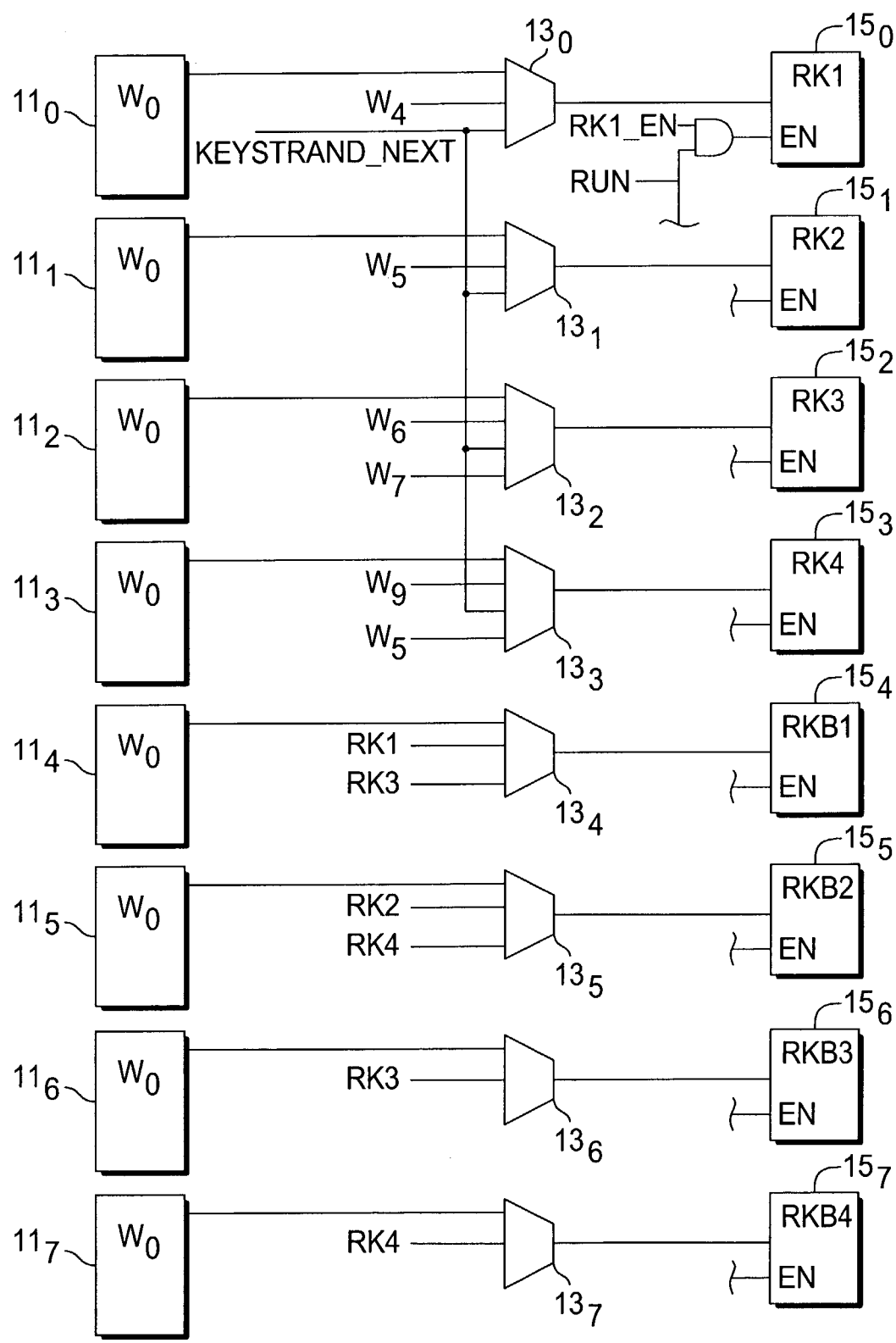
FIGS. 9A and 9B are a schematic block diagram of key generator hardware for the present invention.

The present invention is preferably implemented in hardware circuitry, as an cryptographic engine for a microcontroller or other system circuitry, for example for a smart card. This cryptographic engine may be an application-specific integrated circuit (ASIC) designed to carry out the AES operations, or may be more general purpose processing hardware programmed with firmware to carry out the AES operations. It normally shares the memory with the larger system circuitry. It could also be implemented in software.

The AES/Rijndael algorithm performs a key expansion routine upon a cipher key to generate a key schedule. The key expansion generates a total of Nb(Nr+1) words, where the block size Nb=4 for the AES standard, but may be different for other Rijndael implementations, and where the number of rounds, Nr, is presently specified as [max(Nk, Nb)+6], with Nk being the cipher key size in 32-bit (4-byte) words. The round keys consist of Nb words each, and the resulting key schedule is a linear array of words, denoted [$w_i$], with i in the range $0 \leq i \leq Nb(Nr+1)$. For encryption, the round key words are needed in the forward direction from i=0 to Nb(Nr+1). However, for decryption, the round key words are needed in the reverse direction beginning with i=Nb(Nr+1).

Pseudo-code for the forward key expansion is given in FIPS-197 as follows:

```
KeyExpansion (byte key[4*Nk], word w[Nb*(Nr+1)], Nk)
begin
word temp
i=0
while (i<Nk)
w[i]=word(key[4*i], key[4*i+1], key[4*i+2], key[4*i+3])
i=i+1
end while
i=Nk
while (i<Nb*(Nr+1))
temp=w[i-1]
if (i mod Nk=0)
temp=SubWord(RotWord(temp)) xor Rcon[i/Nk]
else if (Nk>6 and i mod Nk=4)
temp=SubWord(temp)
end if
w[i]=w[i-Nk] xor temp
i=i+1
end while
end
```

SubWord( ) is a function that takes a four-byte input word and applies the S-box table (shown in FIG. 1) to each of the four bytes to produce an output word. The bytes are represented by pairs xy of four-bit hexadecimal values 0 to f. Each pair xy generates an output pair from the S-box table. For example, the byte {53} would be replaced by the substitution byte {ed}. The AES standard (FIPS-197) also specifies an inverse S-box for use with the inverse cipher. An advantage of the present key scheduling invention is that the round keys can be generated in reverse without needing the inverse S-box, but using the same S-box as in the forward direction.

The function RotWord( ) takes a word $[a_0,a_1,a_2,a_3]$ as input, performs a cyclic permutation, and returns the word $[a_1,a_2,a_3,a_0]$.

The round constant word array, Rcon[i], contains the values given by $[x^{i-1},\{00\},\{00\},\{00\}]$, where x={02}, $x^{i-1}$ are powers of x in the finite field $GF(2^8)$ with modular reduction by the irreducible polynomial of degree 8: $m(x) = x^8+x^4+x^3+x+1=\{01\}\{1b\}$. (The modular reduction by m(x) ensures that the result can be represented by a byte.) For reference, the first ten round constants (beginning with i=1) are as follows:

| i | Rcon [i] |
| --- | --- |
| 1 | 01000000 |
| 2 | 02000000 |
| 3 | 04000000 |
| 4 | 08000000 |
| 5 | 10000000 |
| 6 | 20000000 |
| 7 | 40000000 |
| 8 | 80000000 |
| 9 | 1b000000 |
| 10 | 36000000 |

The XOR (exclusive OR) function table for hexadecimal values 0 through f is shown in FIG. 2 for convenience. Note that the XOR function is a bitwise operation (equivalent to addition modulo 2). For two bytes $\{a_7a_6a_5a_4a_3a_2a_1a_0\}$ and $\{b_7b_6b_5b_4b_3b_2b_1b_0\}$, the sum is $\{c_7c_6c_5c_4c_3c_2c_1c_0\}$, where each $c_i=a_i$ XOR $b_i$. These bytes can be represented in hexadecimal notation by a pair of hexadecimal values. It should be noted that the reverse key expansion routine of the present invention takes advantage of a property of the XOR function, namely that $c_i=a_i$ XOR $b_i$ if and only if $a_i=c_i$ XOR $b_i$.

From the pseudo-code given above, it can be seen that the forward key expansion routine begins by filling the first Nk words of the expanded key with the ciper key. Every following word, w[i], is equal to the XOR of the pervious word, w[i−1], and the word which is Nk positions earlier, w[i−Nk]. For words in positions that are a multiple of Nk (i.e., for which i mod Nk=0), a transformation sequence is applied to w[i−1] prior to the XOR with w[i−Nk]. This transformation sequence consists of a cyclic shift of the bytes in the word (i.e., the RotWord( ) function), followed by the application of an S-box table lookup to all four bytes of the word (i.e., the SubWord( ) function), followed by an XOR with the round constant for that word, Rcon[i/Nk]. Additionally, for 256-bit cipher keys (Nk=8) or other large cipher keys (Nk>6) in the Rijndael cipher algorithm, if i−4 is a multiple of Nk (i.e., when i mod Nk =4), then the S-box lookup function, SubWord ( ), is applied to w[i−1] prior to the XOR with w[i−Nk].

FIGS. 3, 5 and 7 give examples of the forward key expansion routine for respective 128-bit, 192-bit and 256-bit cipher keys.

The reverse key expansion method of the present invention generates round keys "on-the-fly", i.e., as needed on a round-by-round basis, in the reverse direction. Pseudo-code for the reverse key expansion is as follows:
ReverseKeyExpansion (word w[Nb*(Nr+1)], Nk)
begin
word temp
i=Nb*(Nr+1)−1
while (i>Nk)
temp=w[i−1]
if (i mod Nk=0)
temp=SubWord(RotWord(temp)) xor Rcon[i/Nk]
else if (Nk>6 and i mod Nk=4)
temp=SubWord (temp)
end if
w[i−Nk]=w[i] xor temp
i=i−1
end while
end The reverse key expansion routine requires that the final Nk words of the round keys from a previous forward expansion be saved in memory. In reverse order, these final round key words are the first round key words for use in the equivalent inverse cipher. Every subsequent word, w[i−Nk], generated in reverse (i.e., with decreasing i), is equal to the XOR of the word, w[i], which is Nk positions earlier and its adjacent word, w[i−1], which may be suitably modified by a transformation sequence. The conditions for applying the transformation sequence, and indeed the transformation sequence itself, is the same as in the forward key expansion. The functions SubWord( ), RotWord( ) and XOR, and the round constant word array, Rcon[i], are exactly the same as those described above for the forward key expansion. For words in positions that are multiples of Nk (i.e., for which i mod Nk=0), the transformation sequence applied to w[i−1] consists of a cyclic shift of the bytes (i.e., the RotWord( ) function), followed by application of the S-box table lookup to all four bytes of the word (i.e., the SubWord( ) function), followed by an XOR with the corresponding round key, Rcon[i/Nk]. Also, for 256-bit cipher keys (Nk=8) or other large cipher keys (Nk>6) in the Rijndael inverse cipher, if i−4 is a multiple of Nk (i.e., when i mod Nk=4), then the S-box lookup function, SubWord( ), is applied to w[i−1] prior to the XOR with w[i] that generates w[i−Nk].

FIGS. 4, 6 and 8 give examples of the reverse key expansion routine for the same 128-bit, 192-bit and 256-bit cipher keys from the forward key expansion examples of FIGS. 3, 5 and 7, respectively. Comparing FIGS. 3 and 4, we can see that the same 44 round key words, w[0] to w[43], needed for the round 0 premix and the subsequent 10 rounds in AES are generated (4 round key words are used per round, since the AES block size, Nb, is 4 32-bit words or 256 bits.) In the forward direction, the expansion begins with the 4 cipher key words, w[0] through w[3]. In the reverse direction, the final 4 words, w[40] to w[43], obtained previously from a forward key expansion and saved in memory are used to derive the other round key words w[39] to w[0] in reverse order. In each direction, the identical transformation sequence is applied to w[i−1] every 4 words, i.e., when i is a multiple of 4 (=Nk). A comparison of rows in FIGS. 3 and 4 with the same value of i, verifies that the transformation sequence in the reverse direction (FIG. 4) is the same as that applied in the forward key expansion direction (FIG. 3). The difference in the forward and reverse key expansions is seen in the final two columns of words. The symmetry of the XOR operation is apparent as those final two columns are reversed in the two directions, with w[i−Nk] being used to generate w[i] in the forward direction (FIG. 3), but with w[i] being used to generate w[i−Nk] in the reverse direction (FIG. 4). Similarly, a comparison of FIGS. 5 and 6 for the same exemplary 192-bit cipher key shows that the reverse key expansion generates the same 52 round key words as the forward key expansion, for the round-0 premix and 12 cipher rounds and for the equivalent inverse cipher rounds in reverse. Similarly, FIGS. 7 and 8 verify that the reverse key expansion correctly generates the 60 round key words in the reverse direction using the 8 saved words obtained from the forward expansion. Note also, that the same SubWord( ) transformation is used in the reverse direction. An inverse S-box table is neither used nor needed for the reverse key expansion of the present invention.

Figure 9B:
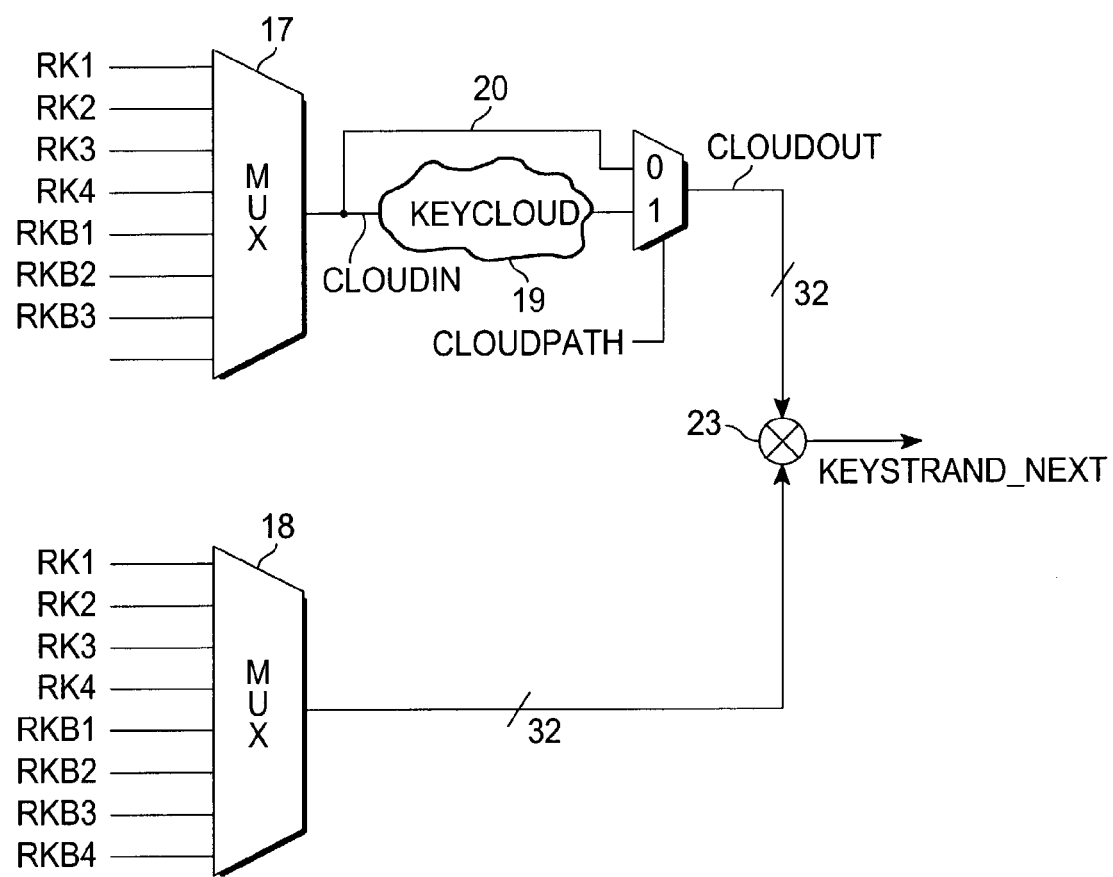

With reference to FIGS. 9A and 9B, the key schedule circuitry includes a plurality of input registers $11_0$ to $11_7$ storing Nk words (here up to 8 in number). For forward encryption these are the first Nk words of the cipher key. For reverse encryption, these registers are loaded with the last Nk round words from a prior encryption round, which have been stored in system memory. The input registers $11_0$ to $11_7$ feed these initial word values through select multiplexers $13_0$ to $13_7$ to round key registers $15_0$ to $15_7$, which store the loaded words. The outputs of the round key registers $15_0$ to $15_7$ are designated rk1 through rk4 and rk1b through rk4b. These outputs are iterated back through the multiplexers $13_0$ to $13_7$ and are also input into a pair of multiplexers 17 and 18 for processing. Multiplexer 17 receives the word w[i−1] that is to be operated upon by the transformation sequence, if appropriate for the index i, while multiplexer 18 receives either w[i−Nk] for the forward key expansion direction or w[i] for the reverse key expansion direction. After passing through transformation circuitry 19 or bypassing it along word bus 20, as selected by multiplexer 21, the two words are input into an XOR gate 23, the result, keystrand-next, of which becomes the next round key word, which updates the round key register $15_0$.

Figure 10:
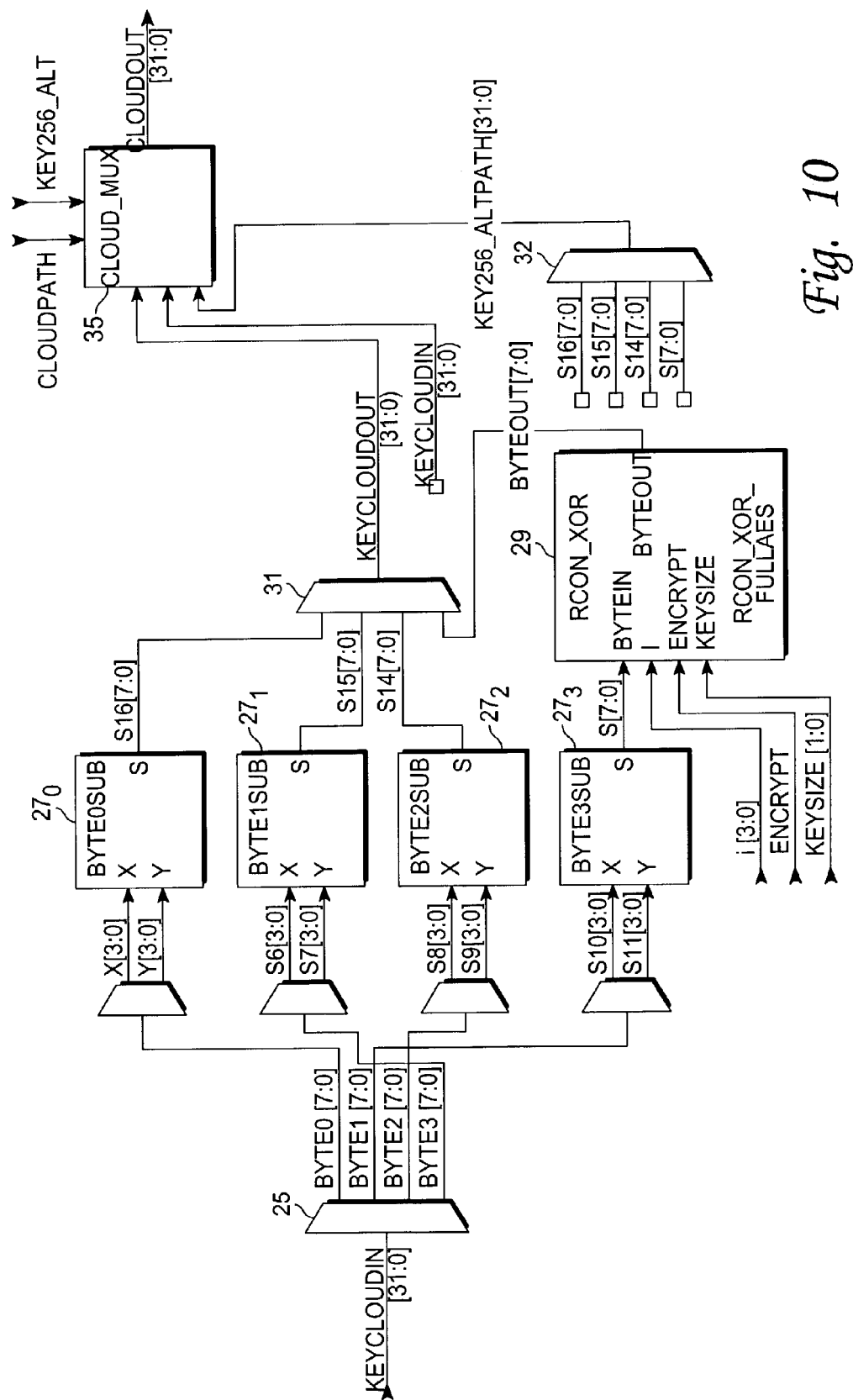
FIG. 10 is a schematic block diagram of the round key transformation hardware for the key generator of FIGS. 9A and 9B.

FIG. 10 shows a transformation circuit 19 for applying the transformation sequence to the round key words w[i−1], when appropriate. The word w[i−$_1$] selected by multiplexer 17 is input as keycloud [31:0] and split and rotated by the 4-by-4 byte multiplexer 25. Each byte is then input into one of the S-boxes $27_0$ to $27_4$, which can be implemented as look-up tables or as a sea of gates. Each S-box outputs a byte result. An round constant XOR circuit 29 receives the first byte of the transformed word and adds the particular round constant corresponding to i/Nk. The circuit 29 receives both the index byte i[3:0] and the keysize [1:0] indication (e.g., 00 for 128-bit keys, 01 for 192-bit keys, and 10 for 256 keys) in order to produce the correct round key constant. The transformed word is recombined by multiplexer 31. For Nk=8, an alternate path from the S-boxes $27_0$ to $27_4$ skips the round constant add block and restores the bytes to the correct un-rotated order for the cases when i mod 8=4. This alternate path combines the transformed word (temp) with multiplexer 32. The untransformed word w[i−1] bypasses the transformation along path 33. The correct temp word is selected by multiplexer 35.

Figure 11:
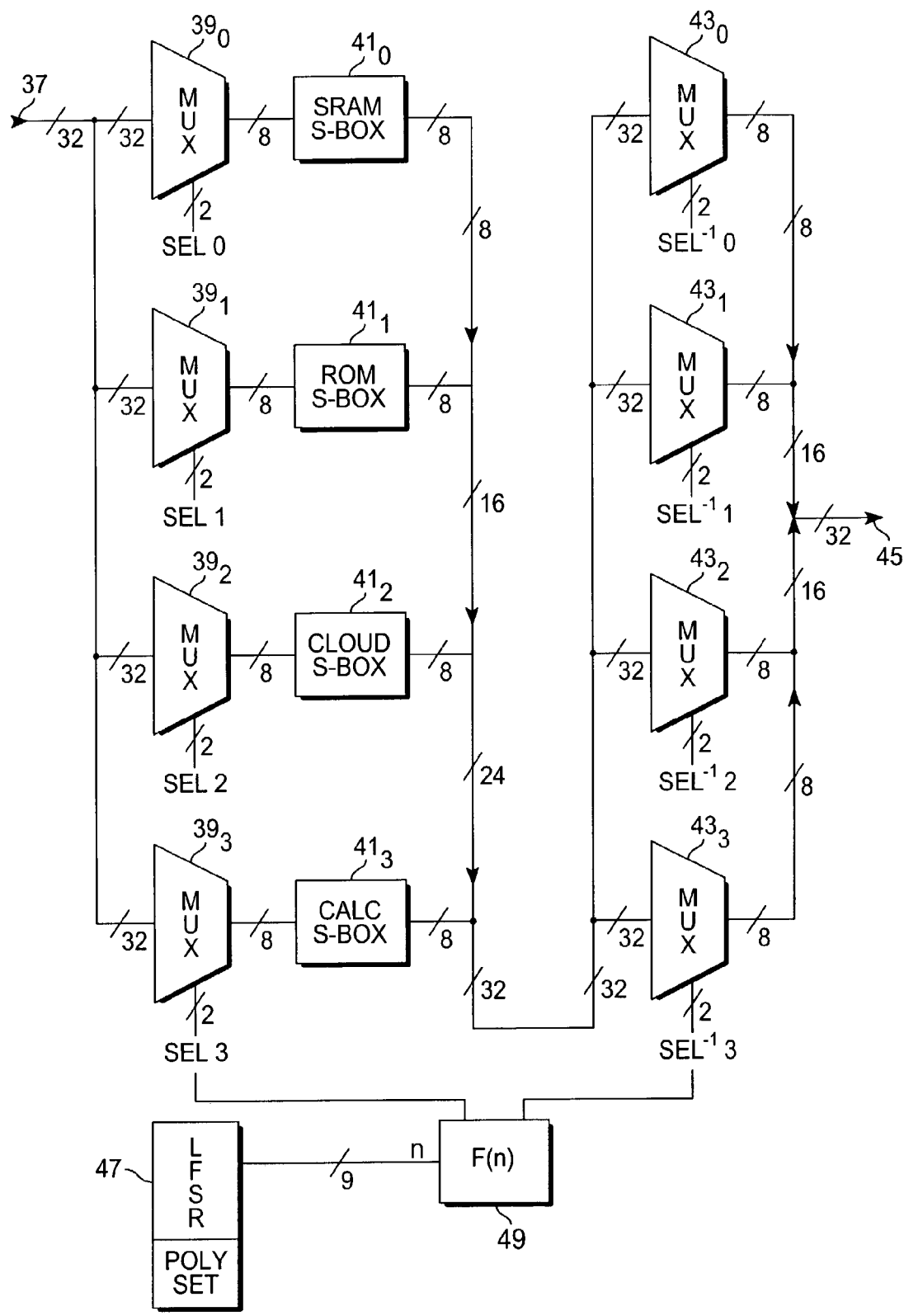
FIG. 11 is an alternative embodiment of the S-box hardware for the round key transformation sequence, wherein the same S-box function is implemented in four distinct ways with different power consumption patterns, with variable paths through the four S-boxes controlled by a random number generator (LFSR).

With reference to FIG. 11, one countermeasure to thwart power analysis attacks upon the key scheduler circuitry is seen, wherein a set of different types of S-box implementations are used. For example, the functionality can be done using an SRAM, a ROM, a cloud circuit, and a calculating circuit, all with different power signatures. For 4 S-boxes, there are 4!=24 different permutations. By randomly changing the order the bytes take through the different boxes, the power signature has 24 different forms it can take. In FIG. 11, a word input 37 is split into bytes that are fed into the different S-boxes $41_0$ to $41_3$. These are then recombined to produce the S-box transformed output word 45. A set of byte select multiplexers $39_0$ to $39_3$ and their complementary set $43_0$ to $43_3$ are controlled by a random generator 47 and select control signal generator 49 to produce the selected path permutation and the word restoring inverse permutation. The random generator 47 may be a linear feedback shift register with some selected polynomial set that governs the generation. The select control signal generator 49 operates according to the table shown in FIG. 12. For each 9-bit range of LFSR output from random generator 47, a particular one of the 24 possible path permutations is selected, and the corresponding select SEL and inverse select $SEL^{-1}$ control signals is output. Other path permutations could be implemented instead by changing the function table of select control signal generator 49, or additionally changing the size or specific pseudo-random function of the LFSR or other random generator 47. The control signal generator 49 may be implemented as a look-up table.

Figure 13:
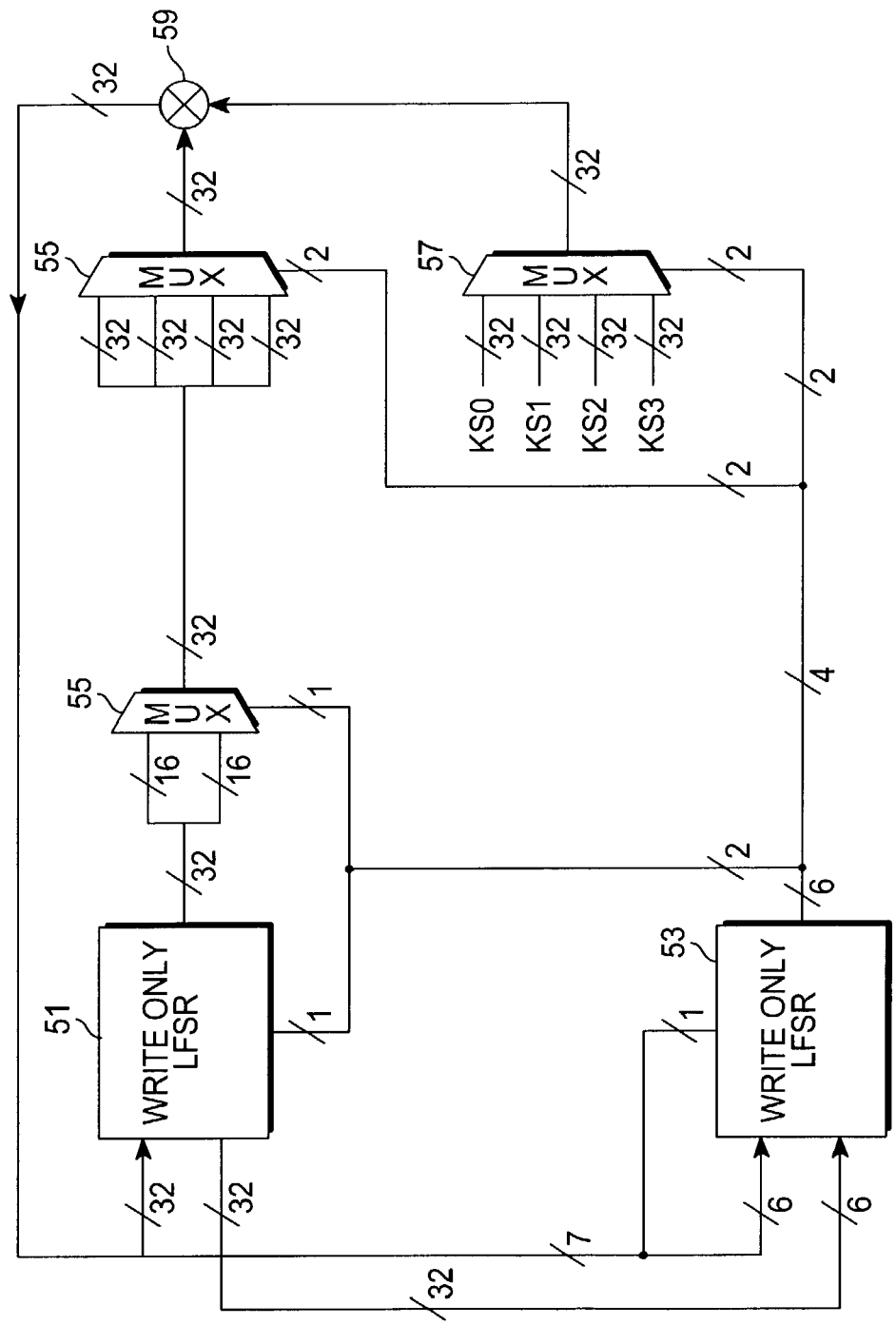
FIG. 13 is a schematic block diagram of a dummy circuit for introducing random power consumption noise during the AES premix (round 0) operation as a countermeasure in a hardware implementation of the present invention.

With reference to FIG. 13, another power and timing analysis countermeasure is a dummy circuit that introduces power noise during the premix (round 0) operation. This dummy circuit matches the propagation delay to the initial XOR premix array and inserts pseudo-random noise generated by a set of random generators, preferably linear feedback shift registers 51 and 53. The multiplexer elements 55-57 match the delay of corresponding elements of the real input circuitry. The output from the word-wide XOR array 59 is not used in the cryptographic processing of the real plaintext, but is feedback to the inputs of the random generators 51 and 53. It matches the properties of the real XOR array (also word-wide), but has different inputs due to the random generation. The random generators also receive the plaintext input, word by word, in order that the dummy signal may bear some relation to the plaintext (but no relation at all to the cipher key), making filtering out of the dummy signature more difficult.

Figure 14:
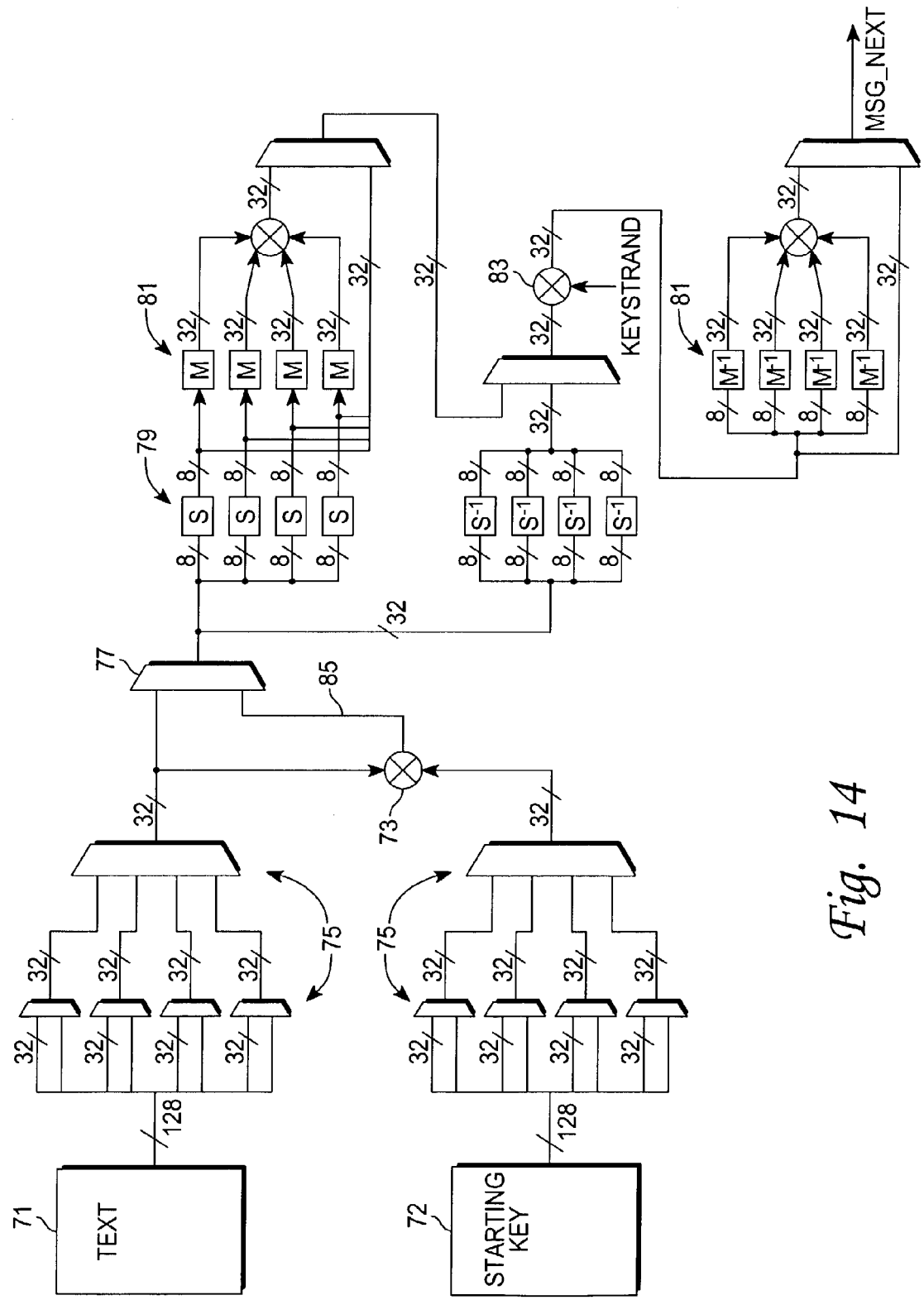
FIG. 14 is a schematic block diagram of the data and cipher key input paths illustrating operation of a premix operation coinciding with on-the-fly key scheduling for the first round.
Figure 15:
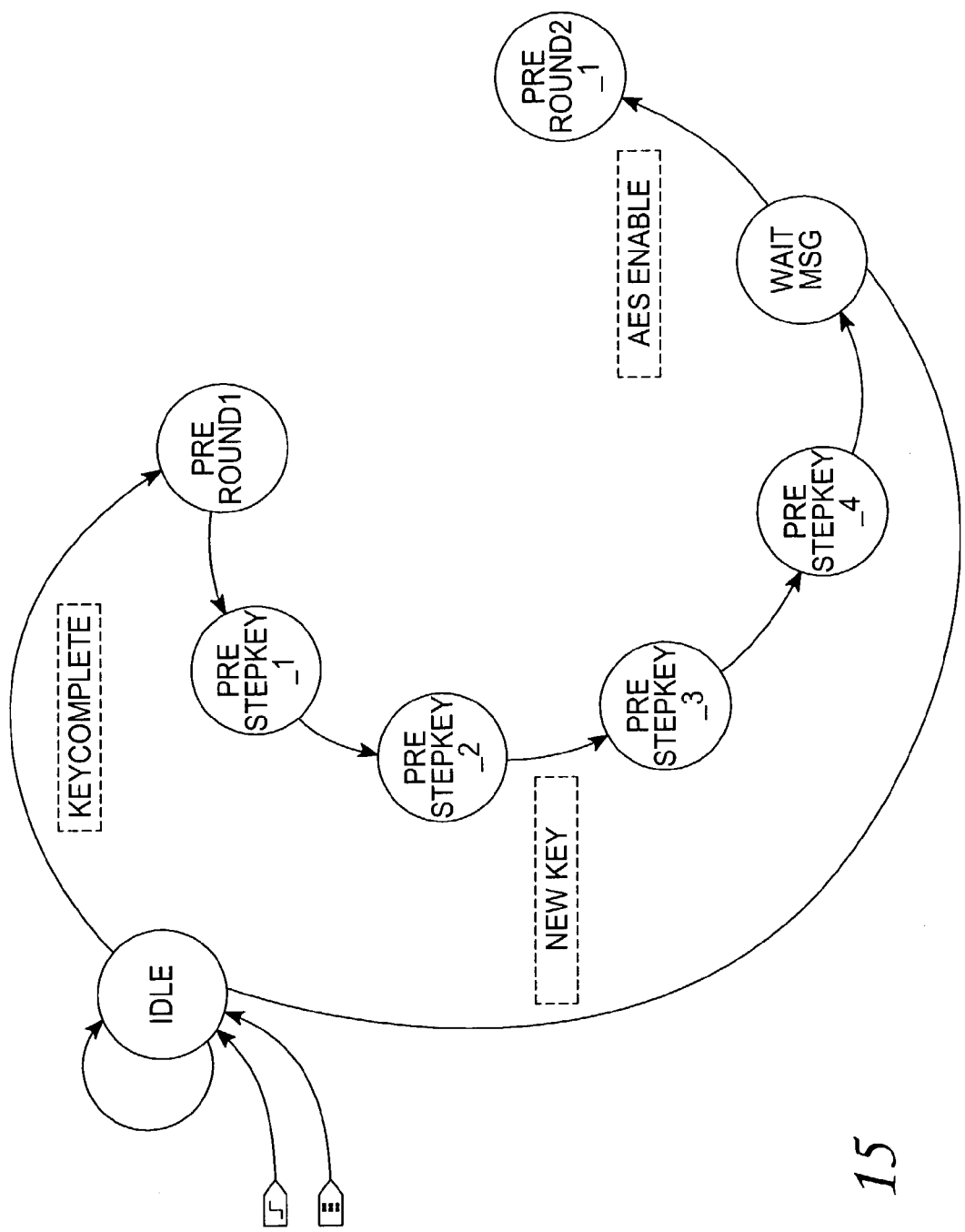
FIG. 15 is a flow diagram for the coincident premix/key scheduling operation carried out with FIG. 14.

With reference to FIGS. 14 and 15, the premix operation combining the plaintext blocks with the cipher key prior to the first round can be performed even while round key words for the first cipher round are generated. A 128-bit plaintext block is received at an input buffer 71. The first 128-bits of the cipher key are likewise received at an input buffer 72. These block size units are processed into 32-bit words and then shifted into the premix XOR array 73 using multiplexers 75. For the last round (or first round for decryption), the key mix operation is skipped, as selected by multiplexer 77 controlled by a state machine programmed in accord with the AES algorithm specification. The AES round 1 then proceeds with S-box transformations 79, column mixing operations 81 and key XOR operations 83 using the round keys. Subsequent rounds receive the transformed words of the block from a previous round at input 84. The key strand for the key XOR operation upon a transformed word comes from the afore-described key scheduler. The key scheduling operation is such, that the first round keys are generated (prestepkey_1 through prestepkey_4 in FIG. 15) during the round 0 premix operation (preround1), so that subsequent rounds, including the first roundm, have the round key words already available to them without needing to wait.

What is claimed is:

1. In a key generator configured to perform a key expansion routine according to the Advanced Encryption Standard (AES)—Rijndael block cipher algorithm so as to generate, from a given cipher key of Nk words, a key schedule of Nb(Nr+1) round-key words w[i], where Nb is the cipher block size in words and Nr is the number of rounds employed by the cipher algorithm, the key generator configured to generate the round-key words w[i] "on-the-fly" as needed on a round-by-round basis, the improvement comprising a method for generating round-key words "on-the-fly" in a reverse direction for use in a decrypt operation of the cipher algorithm, the method including the steps of:
   providing memory for storing a final set of Nk round-key words;
   performing the key expansion routine in a forward direction during an encrypt operation to obtain said final set of Nk round-key words and storing the same in said memory provided therefor;
   setting the key generator for the decrypt operation;
   deriving preceding round-key words w[i−Nk] "on-the-fly" by an XOR logic operation involving stored round-key words w[i] and w[i−1], wherein w[i−1] is first modified by a transformation sequence prior to applying the XOR logic operation whenever i mod Nk=0 and also whenever both Nk>6 and i mod Nk=4, the transformation sequence involving a cyclic byte shift, an S-box byte substitution and an XOR operation with a round constant when i mod Nk=0, the transformation sequence involving only an S-box byte substitution when Nk>6 and i mod Nk=4, said transformation sequence upon w[i−1] being identical in the forward and reverse directions of the key expansion routine and in accord with the AES—Rijndael block cipher algorithm; and
   wherein the key generator is implemented as a hardware circuit and multiple S-boxes are provided to carry out the S-box byte substitutions, each S-box having the same functionality, as specified for AES—Rijndael, but with different hardware implementations characterized by different power consumption signatures, and wherein a pseudo-random generator selects variable pathways to the different S-boxes for the various bytes to be substituted in the key expansion routine.

2. The key generation method of claim 1 wherein the pseudo-random generator is a linear feedback shift register providing an n-bit pseudo-random output and a look-up table addressed by the pseudo-random output and providing pathway selection control signals corresponding to the pseudo-random output.

3. In a hardware block cipher circuit having a pre-mix subcircuit for performing an initial pre-mix XOR operation of a cipher block algorithm that mixes plaintext with a cipher key prior to beginning a sequence of cipher encryption rounds to generate a ciphertext, a differential power analysis countermeasure comprising:
   a pre-mix dummy circuit active during said initial pre-mix XOR operation and characterized by a propagation delay that substantially matches that of said pre-mix subcircuit, the dummy circuit comprising a pseudo-random generator and an XOR array, the XOR array with first inputs connected to outputs of the pseudo-random generator, second inputs connected to receive the same cipher key bits as said pre-mix subcircuit, and outputs feeding back to the pseudo-random generator, whereby the dummy circuit inserts pseudo-random noise into the overall power signature of all XOR gate switching of the hardware block cipher circuit during the initial pre-mix XOR operation.

4. The circuit of claim 3 wherein the pseudo-random generator comprises a set of linear feedback shift registers.

5. The circuit of claim 3 wherein the pseudo-random generator and XOR array of the dummy circuit have a word width in bits identical to that of the pre-mix subcircuit.

6. In a hardware block cipher circuit configured to perform a cipher algorithm having an initial pre-mix XOR operation that mixes plaintext with a cipher key prior to beginning a sequence of cipher encryption rounds to generate a ciphertext, the improvement comprising a method that combines the pre-mix operation with the first cipher encryption round, the method including the steps of:

pre-processing the cipher key to generate round-key words for the first cipher encryption round while plaintext is loaded, the pre-mix XOR operation also occurring as plaintext is being loaded; and executing the first cipher encryption round upon the loaded pre-mixed plaintext using the pre-generated first round-key words.

* * * * *